June 23, 1953

L. J. MOELLER 2,643,287

APPARATUS FOR MEASURING THE SURFACE
RESISTIVITY OF MATERIALS

Filed Dec. 5, 1947

INVENTOR
L.J. MOELLER
BY
ATTORNEY

June 23, 1953

L. J. MOELLER 2,643,287

APPARATUS FOR MEASURING THE SURFACE
RESISTIVITY OF MATERIALS

Filed Dec. 5, 1947

INVENTOR
L.J. MOELLER
BY
ATTORNEY

Patented June 23, 1953

2,643,287

UNITED STATES PATENT OFFICE 2,643,287

APPARATUS FOR MEASURING THE SURFACE RESISTIVITY OF MATERIALS

Lowell J. Moeller, Towson, Md., assignor to Western Electric Company, Incorporated, New York, N. Y., a corporation of New York Application December 5, 1947, Serial No. 789,816

8 Claims. (Cl. 175—183)

1

This invention relates to an apparatus for measuring the surface resistivity of materials, and more particularly to an electrode which facilitates measuring surface resistivities of great magnitude.

The selection of a specific material for electrical insulating purposes is determined primarily by its electrical characteristics, of which its surface resistivity is an important one. Surface resistivity of an insulating material is defined as the ohmic resistance between two opposite edges of a surface film of unit length and unit width. High quality insulating materials have a surface resistivity ranging upwardly of $10^{12}$ ohms per square. One such insulating material used extensively for electrical insulating purposes is polyethylene (polymerized ethylene), which has a surface resistivity between $10^{17}$ and $10^{18}$ ohms per square.

To measure the resistance of such surfaces, it is necessary to impress a high D. C. potential across the opposite edges of a unit width of such a surface and to measure the current leaking thereacross. The measurement of such high surface resistivity poses the problem of providing means for positioning a sufficient number of units of the surface in parallel so that when a difference of potential is applied across each of the parallel units, the total current leakage across the parallel units of the surface will be of a magnitude capable of being measured by a very sensitive current responsive instrument, such as a galvanometer.

An object of the invention is to provide new and improved apparatus for measuring the surface resistivity of materials.

An apparatus embodying certain features of the invention comprises means for providing a plurality of parallel air gaps of predetermined length and width, an electric circuit for impressing a potential across each of the air gaps, means for clamping the surface of a piece of material whose surface resistivity is to be measured against the air gaps, thereby placing the potential across a plurality of parallel units of the surface of the material, and means connected in the circuit for measuring the total current leakage across the parallel units of the surface being measured, whereby the surface resistivity of the material is determined.

A clear understanding will be had from the following detailed description of a specific embodiment thereof, when taken in conjunction with the appended drawings, in which:

Fig. 1 is an enlarged, vertical, sectional view

2 of an electrode embodying preferred features of the invention and having portions thereof broken away for clarity;

Figure 1:
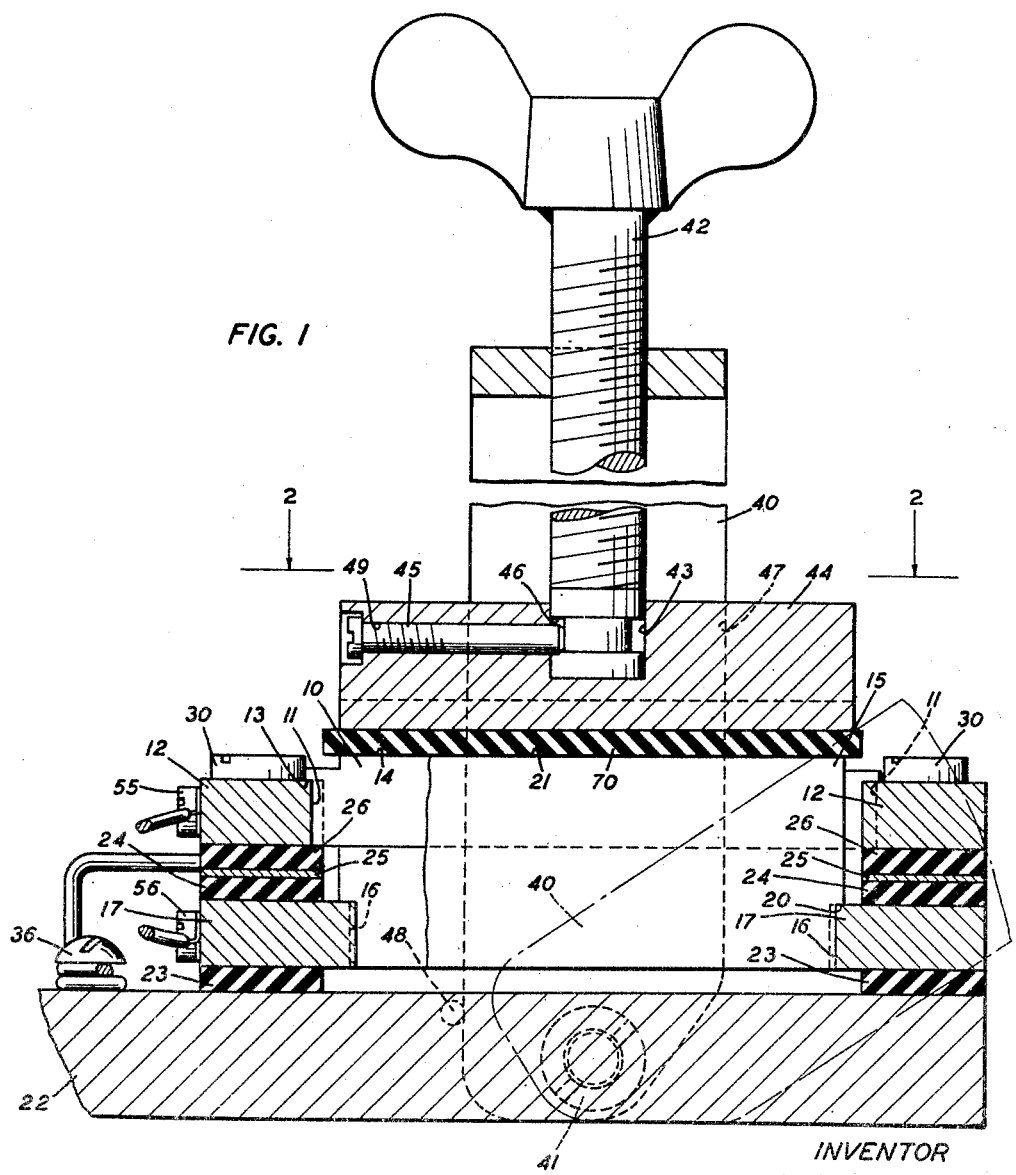
Figure 2:
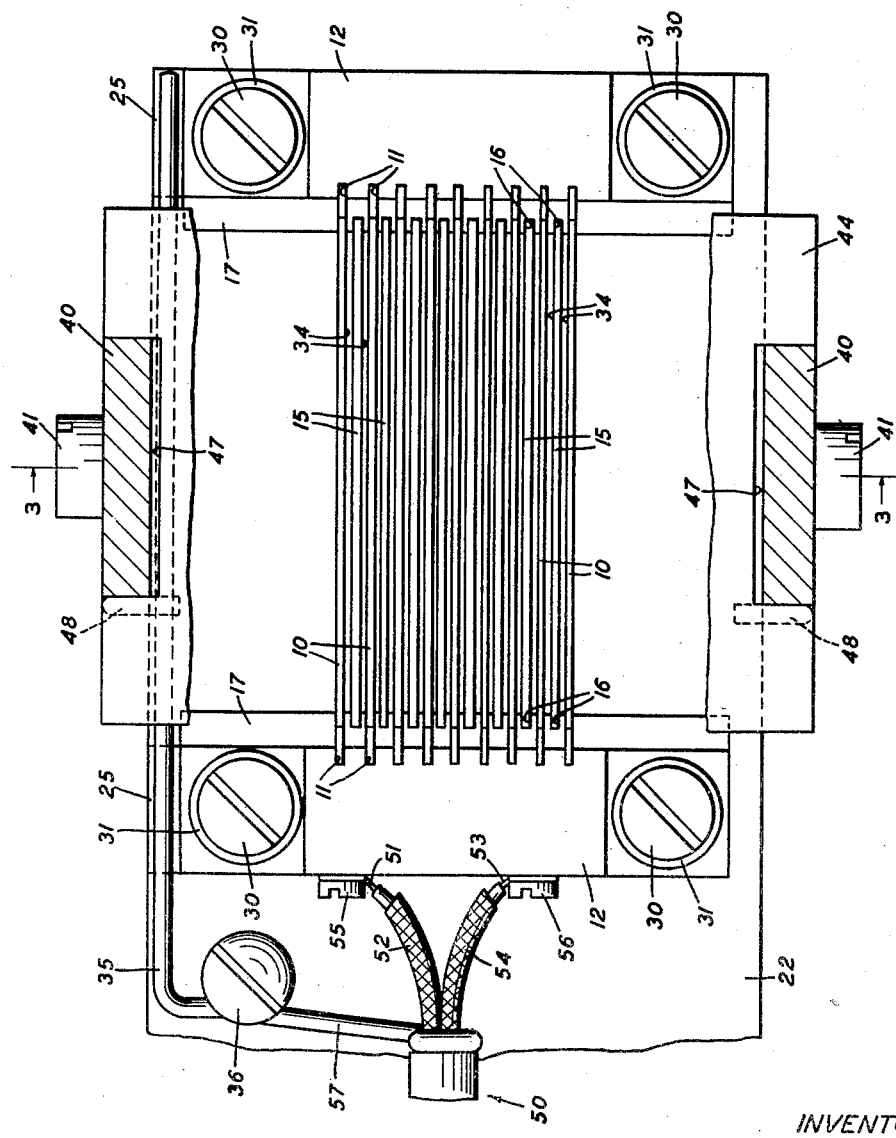
Fig. 2 is a horizontal section view of the electrode taken along line 2—2 of Fig. 1 and having portions thereof broken away for clarity.

Referring now to the drawings, and more particularly to Fig. 2, a plurality of rectangular contact plates 10—10 are mounted in an edgewise position in slots 11—11 provided along the edge of a pair of spaced supports 12—12. The plates 10—10 are positioned in the slots so that shoulders 13—13 (Fig. 1) provided at the ends of the plates engage the top surface of the supports 12—12. These shoulders act as gauges for aligning contact surfaces 14—14 of the plates in the same plane and at a predetermined distance above the top surface of the supports 12—12.

The slots 11—11 are equally spaced along the opposed edges of the supports 12—12 to provide parallel alignment of the plates and are designed to engage the ends of the plates 10—10 tightly so that a very tight fit is provided between the supports and the ends of the plates. In addition, the ends of each of the plates 10—10 are soldered in the slots 11—11 to prevent corrosion occurring at the points of contact between the plates and the supports and thereby maintain a low resistance electrical contact between the ends of the plates and their respective supports. The contact surfaces 14—14 of the plates 10—10 (Fig. 3) must be as flat as possible and the corners thereof must be sharp and free from overhanging burrs. The bottom edges of the plates may be bevelled slightly to remove burrs therefrom.

A second group of rectangular contact plates 15—15 (Fig. 2) is similarly mounted in an edgewise position in slots 16—16 provided along the inner faces of a pair of spaced metallic supports 17—17. Each of the plates 15—15 is provided with shoulders 20—20 (Fig. 1) at the ends thereof for engaging the top surface of the respective supports 17—17, which shoulders serve to locate the contact surfaces 21—21 of the plates a predetermined distance above the top surface of the supports 17—17 and further to align the contact surfaces in the same plane. The slots 16—16 provided in the supports 17—17 are equally spaced to provide parallel alignment of the plates and are designed to produce a tight fit with the ends of the plates 15—15. The ends of the plates 15—15 are also soldered into the slots in the same manner and for the same reasons as have been described for the assembly of the plates 10—10 in their respective supports. The slots 16—16 provided in the supports 17—17 are spaced the same distance apart as are the slots 11—11 provided in the supports 12—12, which spacing is substantially greater than the thickness of the plates 10—10 and 15—15. Likewise, the contact surfaces 21—21 of the plates 15—15 must be as flat as possible and have sharp corners which are free of overhanging burrs. The bottom edges of the plates 15—15 may be slightly bevelled to remove burrs therefrom.

It is believed to be apparent from the above description that the assembly of the plates 10—10 on the supports 12—12 and the assembly of the plates 15—15 on the supports 17—17 produces two substantially similar units having a plurality of equally spaced parallel plates and that the spacing between the plates of the two units permits the units to be assembled so that the plates will intermesh with each other without physical contact.

Figure 4:
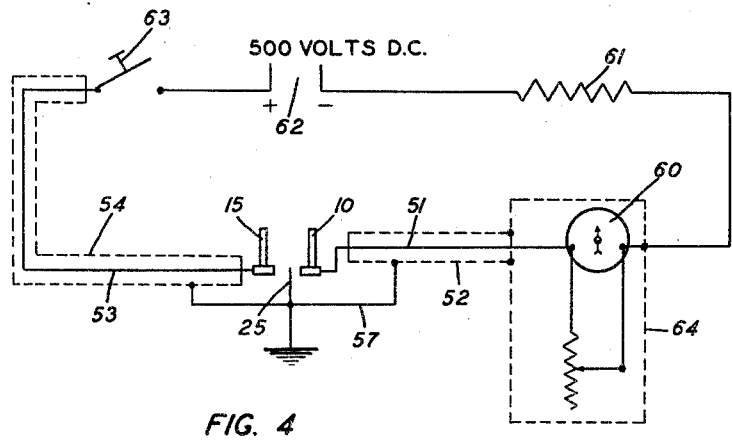
Fig. 4 is a schematic wiring diagram showing the connections employed in utilizing the electrode for measuring the surface resistivity of materials.

The plates 10—10 and 15—15 are assembled on different supports in order that they may be connected to opposite sides of a high D. C. potential circuit, as shown in Fig. 4. To form the base of the electrode embodying the present invention, the assembled units consisting of the plates 10—10 secured to the supports 12—12 and the plates 15—15 secured to the supports 17—17 are mounted and secured on a base plate 22 in the following manner:

A pair of insulating strips 23—23 (Fig. 1) of proper thickness and insulating quality are positioned spacedly on the base plate 22 to suit the spacing between the supports 17—17. The assembled unit consisting of the plates 15—15 and the supports 17—17 is then positioned on the insulating strips 23—23, as shown in Fig. 1. A pair of insulating strips 24—24 is positioned on top of the supports 17—17, a metallic guard plate 25 is positioned on top of each of the insulating strips 24—24, and a second insulating strip 26 is positioned on top of each of the guard plates 25—25. On top of this assembly, the assembled unit consisting of the plates 10—10 and the supports 12—12 is positioned on the insulating strip 26 in such a manner that the plates 15—15 are positioned between the plates 10—10.

The various above-described units are secured to the base 22 by screws 30—30, each of which extends through a bore 27 (Fig. 3) provided in the supports 12—12, a bore 28 provided in the supports 17—17, and suitable bores provided in the insulating strips 23, 25 and 26 and the guard plate 24, and threadedly engage a tapped bore 29 provided in the base 22. The screws 30—30 are insulated from the supports 12—12 by means of flanged bushings 31—31 made of suitable insulating material and positioned in the bores 27—27 provided in each of the supports 12—12 and from the supports 17—17 by bushings 32—32 made of insulating material and positioned in the bores 28—28 provided in the supports 17—17.

Figure 3:
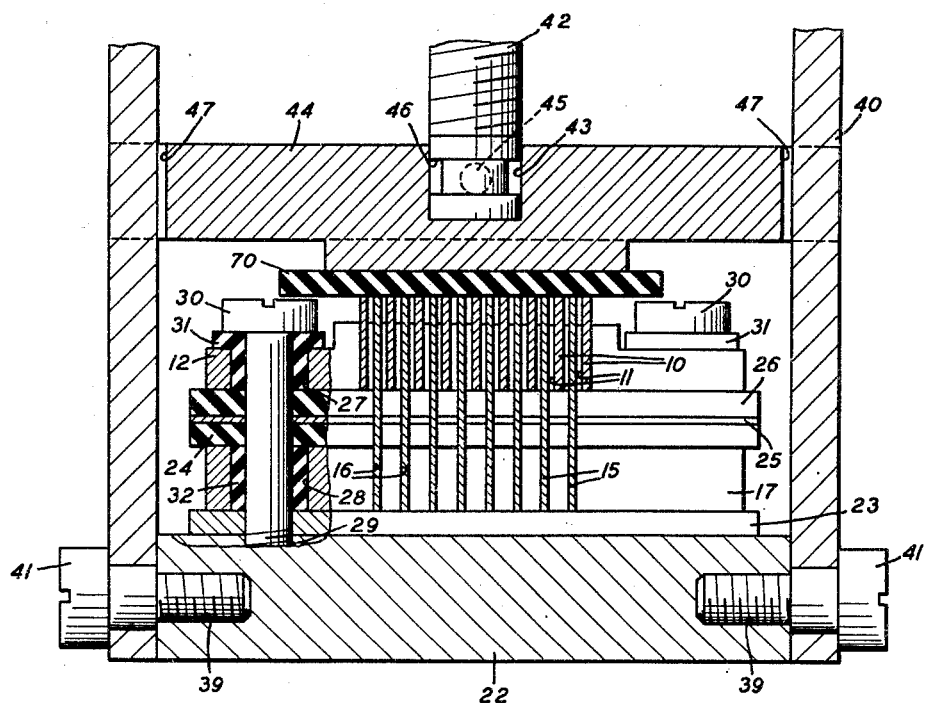
Fig. 3 is an enlarged, vertical, sectional view taken along line 3—3 of Fig. 2 looking in the direction of the arrows.

When the component parts of the electrode have been secured to the base 22 in this manner, the plates 10—10 and 15—15 are of such depth that the contact surfaces 14—14 of the plates 10—10 and the contact surfaces 21—21 of the plates 15—15 lie in the same plane and are substantially parallel to the base 22 (Fig. 3). Since it is essential that the contact surfaces of the plates lie in the same plane, after the two groups of plates are assembled on the base 22 in the manner described, it may be necessary, due to manufacturing discrepancies, to grind or otherwise treat the contact surfaces of the plates in order to make certain that these surfaces lie in the same plane.

The bores 27—27 provided in the supports 12—12 and the bores 28—28 provided in the supports 17—17, through which the screws 30—30 pass, are so arranged that when aligned with each other, the plates 15—15 mounted on the supports 17—17 are positioned centrally between the plates 10—10 mounted on the supports 12—12. It will be noted that the supports 17—17 have widths greater than those of the supports 12—12 so that the plates 15—15 mounted thereon may extend upwardly therefrom to intermesh with the plates 10—10 and yet have their ends spaced sufficiently far away from the supports 12—12 to provide the proper clearance therebetween. The contact surfaces 14—14 of the plates 10—10 are undercut at each end thereof so that the length of the contact surfaces 14—14 will be the same as that of the contact surfaces 21—21.

By virtue of this assembly, the plates 10—10 and 15—15 coact to form a plurality of parallel air gaps 34—34 of uniform width and length between the plates. One end of each of the guard plates 25—25 (Fig. 2) extends beyond the ends of the supports 12—12 and the insulating strips 24 and 26 (Fig. 1) so that a wire 35 may be soldered to the end of each guard plate. The free end of the wire 35 is secured to the base 22 by a screw 36 threadedly mounted in the base.

A U-shaped member 40 is pivotally mounted to the base 22 in an inverted position by means of studs 41—41 threadedly mounted in tapped bores 39—39 provided in the sides of the base. A thumb screw 42 is threadedly mounted in the horizontal leg of the U-shaped member with the free end thereof loosely positioned in a bore 43 provided in a rectangular, clamping plate 44 slidably positioned between the vertical legs of the U-shaped member 40. The plate 44 is retained on the end of the thumb screw 42 by means of a screw 45 mounted in a tapped bore 49 provided in the plate 44, which communicates with the bore 43 so that the end of the stud 45 may engage a groove 46 provided in the end of the thumb screw 42.

The plate 44 is wider than the spacing between the vertical legs of the U-shaped member 40 and is provided with a groove 47 at each side thereof to permit the plate to be slidably positioned between the legs of the U-shaped member. The grooves permit free movement of the plate between the parallel legs of the U-shaped member 40 and at the same time hold the plate centrally between the legs and prevent the plate from turning when the thumb screw is operated to raise or lower the plate as desired. A pin 48 is provided in each side of the base 22 to stop the U-shaped member in a substantially vertical position.

An insulated cable indicated generally by the numeral 50 (Fig. 2) includes an insulated conductor 51 having a metallic shield 52 and an insulated conductor 53 having a metallic shield 54. One end of the cable 50 is secured to the base 22 so that the prepared end of the conductor 51 may be secured to the left hand support 12 by a screw 55 and the prepared end of the conductor 53 may be secured to the left hand support 17 by a screw 56. A bare wire 57 has one end thereof formed around and soldered to the adjacent ends of the metallic shields 52 and 54 of the conductors 51 and 53 and has the other end thereof secured under the screw 36.

By virtue of this arrangement, the plates 10—10 are connected to the conductor 51, the plates 15—15 are connected to the conductor 53, and the ends of the guard plates 25—25 positioned between the insulating strips 24 and 26 are connected to the metallic shields 52 and 54. When the cable 50 is connected to a suitable source of D. C. potential, as shown in Fig. 4, it follows that the plates 10—10 and 15—15 are connected to the opposite sides of such a potential source, thereby impressing a difference of potential across each of the air gaps 34—34. It will also be noted that the air gaps 34—34 are connected in parallel with respect to the conductors 51 and 53. The connections including the wire 35 and the wire 57 serve to connect the shields 52 and 54 and the guard plates 25—25 to the grounded base 22. This will direct any current leakage from the supports 12 and 17 across the insulating strips 24 and 26 to ground.

The conductors 51 and 53 of the cable 50 connect their respective plates to suitable apparatus for measuring the current leakage across the air gaps 34—34, such as the circuit shown schematically in Fig. 4, which basically is an "Ayrton Shunt" measuring circuit. The free end of the conductor 51 is connected to a very sensitive galvanometer 60, which in turn is connected to a current limiting resistance 61. The opposite side of the resistance 61 is connected to one side of a source of D. C. potential indicated by the numeral 62, which, in this particular case, is capable of impressing a potential of 500 volts D. C. The other end of the conductor 53 is connected to a switch 63, which in turn is connected to the other side of the D. C. potential source 62. These connections place the air gaps 34—34, which are connected in parallel with each other, in series with the galvanometer 60, the resistance 61 and the switch 63.

Obviously, when the switch is closed, a potential difference of 500 volts D. C. is applied across each of the air gaps 34—34. The shields 52 of the conductor 51 is connected to a shield 64 surrounding the galvanometer 60 which in turn has one side thereof connected to the shield 64. Since the guard plates 25—25 are connected to the conductor 51 by the wire 57, any leakage current that flows across the insulating strips from the supports 12 and 17 is bypassed around the galvanometer. In this way, the galvanometer is subjected only to the actual leakage currents which may occur across the air gaps 34—34 between the plates 10—10 and 15—15. Therefore, when the switch 63 is closed with only air bridging the contact surfaces of the plates 10—10 and 15—15, the galvanometer remains at its zero setting.

The above-described electrode is constructed in the particular manner described to enable the determination of the surface resistivity of a sample piece 70 of a material, such as a high quality insulating material like polyethylene. The sample piece 70, as shown in Figs. 1 and 3, is positioned across the contact surfaces 14—14 and 21—21 of the plates 10—10 and 15—15 and clamped securely thereagainst by raising the U-shaped member 40 to its vertical position and lowering the plate 43 against the sample 70 by turning the thumb screw 41 (Fig. 1). When the sample 70 is clamped in position across the contact surfaces of the plates, one surface thereof engages the contact surfaces of the plates and also bridges each of the gaps 34—34 between the plates. By the particular arrangement of the plates a representative portion of the surface of the sample 70 bridges the gaps 34—34, and it is these portions of the surface of the sample which are subjected to the D. C. potential to determine the surface resistivity of the sample of insulating material.

Surface resistivity of any material is, by definition, the ohmic resistance of a unit length and unit width of a surface, and is ordinarily referred to as "ohms per square." When the sample 70 is clamped across the contact surfaces of the plates 10—10 and 15—15 in the manner described, the surface of the sample is thereby divided into a predetermined number of parallel portions equal in number, width and length to the corresponding number, width and length of the gaps 34—34. The length of the parallel portions of the surface is determined by the length of the contact surfaces of the plates. These parallel portions of the surface of the sample in turn represent a predetermined number of squares of unit length and unit width, which number is determined by dividing the total length of the parallel portions of the surface bridging the gaps 34—34 by the width of the gap 34. When the switch 63 is closed, the D. C. potential is impressed across each of the parallel portions of the surface of the sample 70 bridging the plates, and likewise, across each of the unit squares of the surface by which the surface resistivity is ultimately to be determined.

The parallel portions of the surface of the sample 70 are connected in parallel with each other, so that the total resistance of the surface of the material embraced between the plates is reduced to such a value that a measurable current will flow across the surface of the material. The total value of the current flowing in the circuit as a result of this leakage current flowing across the parallel paths of the surface of the sample 70 will, therefore, be sufficient to actuate the sensitive galvanometer 60. The scale of the galvanometer may be calibrated to read directly in ohms or may be calibrated in ten thousandth microamperes. In any event, the reading of the galvanometer 60 will serve to indicate the actual value of ohmic resistance in the circuit due to the resistance of the surface of the sample 70 embraced between the plates. It is then necessary to convert this total resistance to ohms per square unit of the surface in order to determine the resistivity of the surface. This conversion is made by multiplying the ohmic resistance determined from the galvanometer reading by the total number of unit squares produced by the number, length and spacing of the plates 10—10 and 15—15.

To illustrate more clearly the procedure by which the ohmic resistance indicated by the galvanometer is converted to its equivalent value of surface resistivity of the sample 70, the actual construction of an electrode illustrated by the above-described electrode will be considered. The electrode illustrated on the drawings comprises nine plates 10—10 and eight plates 15—15 having contact surfaces 14—14 and 21—21, respectively, 2" long. The plates are assembled on their respective supports and on the base 22 so as to leave sixteen air gaps 34—34 therebetween, each air gap having a width of 0.032". The sample 70 of insulating material whose surface resistivity to be measured is of such size that it completely covers the contact surface of the plates.

When the sample 70 is clamped across the plates there are sixteen parallel portions of its surface bridging the gaps 34—34 or sixteen parallel portions of its surface 0.032" wide and 2" long. Since surface resistivity is defined as the resistance of a surface in ohms per unit square, it is, therefore, necessary to determine the number of unit squares embraced by the plates. This is obtained by multiplying the number of parallel portions by the length of the portion and dividing the product thereof by the width of the portion, that is $16 \times 2'' = 32'' \div 0.032''$, and it is seen that the plates embrace 1000 unit squares of the surface of the sample 70 which unit squares measure 0.032" by 0.032". The number of unit squares, which is 1000, is known as the conversion factor of the electrode for converting the resistance of the surface to resistivity of the surface in ohms per unit square. When the switch 63 is closed, the 500 volts D. C. potential is impressed across each of the sixteen parallel portions of the surface of the sample 0.032" wide and 2" long, which in turn equals 1000 square units of the surface measuring 0.032" square.

Let it be assumed that the sample 70 is polymerized ethylene, which is known commercially as "polyethylene." Polyethylene has a surface resistivity ranging between $10^{17}$ and $10^{18}$ ohms per unit square. To determine such a high value of surface resistivity, it is necessary to employ a resistance measuring device capable of measuring resistances up to $10^{16}$ ohms. In the present case the galvanometer 60 is connected in the D. C. circuit so as to be responsive to the total current flowing in the circuit resulting from the current leakage across the sixteen parallel portions of the surface of the material embraced between the plates 10—10 and 15—15. These portions of the surface of the sample are connected in parallel so that a measurable current will flow in the circuit and through the galvanometer. As pointed out above, any current leakage across the insulating strips 24 and 26 is grounded and does not affect the operation of the galvanometer. Actually the leakage current flowing across these 16 parallel portions of the surface of the sample represents the ohmic resistance of the total surface embraced by the gaps 34—34. It is, therefore, necessary to convert this ohmic resistance of the surface into its equivalent value of surface resistivity. Assuming that the total current flowing in the D. C. circuit is such that the galvanometer indicates that the ohmic resistance of the total surface of the sample subjected to the 500 volts D. C. is $10^{15}$ ohms. Since the electrode has been designed to have a conversion factor of 1000, it only is necessary to multiply the $10^{15}$ ohms by 1000 to obtain the surface resistivity of the polyethylene sample, which is $10^{18}$ ohms per unit square of surface.

What is claimed is:

1. An apparatus for measuring the surface resistivity of insulating materials having a surface resistivity in excess of $10^{12}$ ohms per square, which comprises a plurality of contact plates spacedly arranged to produce parallel air gaps therebetween of uniform width and length, means for supporting said contact plates so that the top edges thereof are aligned in the same plane so that when a piece of insulating material whose surface resistivity is to be measured is positioned on the contact plates its surface engages each contact plate and bridges the air gaps formed therebetween, means provided on the member for clamping the piece of insulating material to be tested against the edges of the contact plates, a circuit arranged to apply a D. C. potential to the contact plates so that the air gaps provided between the contact plates are connected in parallel with each other in the D. C. circuit, said D. C. potential arranged to have an intensity sufficient to cause a leakage current to flow across the surface of each portion of the insulating material bridging the air gaps between the contact plates, and sensitive current responsive means provided in the D. C. circuit for measuring the total leakage current flowing across the portions of the surface of the insulating material bridging the said air gaps and thereby connected in parallel in the D. C. circuit, whereby the surface resistivity of the insulating material may be determined.

2. An apparatus for measuring the surface resistivity of insulating materials having a surface resistance in excess of $10^{12}$ ohms per square, which comprises a series of equally spaced contact plates mounted in an edgewise position so as to intermesh with each other and leave a plurality of air gaps therebetween of uniform length and width, a base, means positioned on the base and insulated therefrom for supporting the first and the following alternate plates at their extremities, a second means positioned on the first supporting means and insulated therefrom for supporting the second and following alternate plates at their extremities, said contact plates mounted on the said supports having a depth with respect to each other so as to align the top edges of the plates in the same plane, means provided on the base for selectively clamping a piece of insulating material whose surface resistivity is to be measured against the edges of the contact plate whereby its surface is divided thereby into a predetermined number of parallel strips of uniform length and width which bridge the air gaps between the contact plates, a circuit arranged to apply a D. C. potential to the contact plates so that the air gaps formed between the plates are connected in parallel in the circuit, said D. C. potential having an intensity sufficient to cause a leakage current to flow across the surface of the parallel strips of the insulating material which bridge the said air gaps, and means provided in the D. C. potential circuit for measuring the total leakage currents flowing across the surface of the strips of the insulating material bridging the air gaps between the plates, whereby the surface of the resistivity of the material may be determined.

3. An apparatus for measuring the surface resistivity of insulating materials having a surface resistivity in excess of $10^{12}$ ohms per square, which comprises a plurality of equally spaced contact plates mounted in an edgewise position so as to intermesh with each other and leave a plurality of air parallel gaps therebetween of uniform width and length, a base, means spacedly positioned on the base and insulated therefrom for supporting the odd numbered plates at their extremities, a second means positioned on the first supporting means and insulated therefrom for supporting the even numbered plate at their extremities, said contact plates being of such depth that the top edges of the plates are aligned in the same plane, a metallic plate positioned between each of the said supports and insulated therefrom, means provided on the base for selectively clamping a piece of insulating material whose surface resistivity is to be measured against the edges of the contact plates whereby the surface of the insulating material is divided into a predetermined number of parallel strips of uniform width and length which bridge the air gaps therebetween, a circuit arranged to apply a D. C. potential difference across the contact plates so that the air gaps formed therebetween are connected in parallel in the circuit, said D. C. potential having an intensity sufficient to cause leakage currents to flow across the surface of the strips of the insulating material bridging the air gaps between the plates, and sensitive current responsive means provided in the D. C. circuit for measuring the total leakage currents flowing across the surface of the strips of the insulating material, from which current the surface resistivity of the insulating material may be determined, and a separate circuit connected to the guard plates positioned between the insulated supports for preventing any leakage currents between the supports from passing through the current responsive means, whereby only the leakage currents flowing across the surface of the strips of the insulating material flow through the current responsive means.

4. An apparatus for measuring the surface resistivity of the insulating materials having a surface resistivity in excess of $10^{12}$ ohms per square, which comprises a base, a pair of supports spacedly positioned on the base and insulated therefrom and having a predetermined number of equally spaced transverse slots provided along the opposed edges thereof, a plurality of rectangular contact plates mounted in an edgewise position so that the opposite ends of each plate engage corresponding slots in the said supports, said plates having a shoulder provided on each end thereof for aligning the top edges of the plates positioned in the slots of said supports in the same plane, a second pair of supports positioned on top of the first-mentioned supports and insulated therefrom and having a predetermined number of equally spaced slots provided along the opposed edges thereof, the spacing of the slots in the second pair of supports being equal to the spacing of the slots of the first-mentioned pair of supports, a plurality of rectangular contact plates mounted in an edgewise position so that the opposite ends of each plate engage corresponding slots in the second pair of spaced supports, each of said last mentioned contact plates having a shoulder provided at each end thereof for aligning the top edges of the plates assembled in their respective slots in the same plane, said bottom supports having their slotted edges spaced closer together than the first pair of supports so that the edges of the plates supported thereby are properly spaced from the upper supports, said contact plates mounted on the supports being of such depth that the top edges of all the plates lie in the same plane, a guard plate positioned between each of said spaced supports and insulated therefrom, said supports being aligned with each other so that their respective plates intermesh but leave a predetermined number of parallel air gaps therebetween of uniform width and length, means pivotally mounted on the base for clamping a piece of insulating material whose surface resistivity is to be measured against the top edges of the contact plates, a circuit arranged to apply a D. C. potential to the supports so that the air gaps provided therebetween are connected in parallel in the circuit, said D. C. potential having an intensity sufficient to cause leakage current to flow across the surface of the strips of the insulating material bridging the air gaps between the plates, a galvanometer provided in the D. C. circuit for measuring the total leakage currents flowing across the surface of the strips of insulating material bridging the said parallel air gaps so that the surface resistivity of the insulating material may be determined, and a separate circuit connected to the guard plates so that any leakage currents flowing between the insulated supports of said contact plates is shunted by the galvanometer, whereby only the leakage currents flowing across the surface of the strips of the insulating material from which the resistivity of the material is determined flow through the galvonometer.

5. An apparatus for measuring the surface resistivity of insulating materials having a surface resistivity in excess of $10^{12}$ ohms per square, which comprises a series of seventeen contact plates spacedly mounted in an edgewise position so as to intermesh with each other and leave sixteen air gaps therebetween measuring .032" in width and 2" in length, a base, means positioned on the base and insulated therefrom for supporting the nine odd numbered plates, a second means positioned on top of the first supporting means and insulated therefrom for supporting the eight even numbered plates at their extremities, said odd numbered and even numbered contact plates being of such width with respect to each other that when they are assembled on the base the top edges thereof lie in the same plane, means provided on the base for selectively clamping a piece of insulating material whose surface resistivity is to be measured against the edges of the contact plates whereby its surface is divided by the contact plates into 16 parallel strips .032" wide and 2" long which bridge the air gaps between the plates, a circuit arranged to apply a potential of 500 volts D. C. across the supports of the odd and even numbered contact plates whereby the air gaps formed therebetween are connected in parallel in the circuit, said D. C. potential having an intensity sufficient to cause leakage currents to flow across the surface of the parallel strips of the insulating material bridging the air gaps between the plates, and a galvanometer provided in the D. C. potential circuit for measuring the total leakage currents flowing across the surface of the strips of the insulating material bridging the air gaps between the plates, whereby the surface resistivity of the material may be determined.

6. In an apparatus for measuring the surface resistivity of insulating materials having a surface resistivity in excess of $10^{12}$ ohms per square, which comprises seventeen contact plates spacedly mounted in an edgewise position so as to intermesh with each other and leave sixteen parallel air gaps therebetween measuring .032" in width and 2" in length, a base, means positioned on and insulated from the base for supporting the odd numbered plates at their extremities, a second means positioned on and insulated from the first supporting means for supporting the even numbered plates at their extremities, said contact plates being of such width that when they are positioned on the base the top edges thereof lie in the same plane, a metallic plate positioned between the insulating strips positioned between respective supports of the contact plates, means provided on the base for selectively clamping a piece of insulating material whose surface resistivity is to be measured against the edges of the contact plates whereby the surface of the insulated material is divided into sixteen parallel strips .032" wide and 2" long which bridge the air gaps between the plates, a circuit arranged to apply a potential of 500 volts D. C. to the supports for the contact plates so that the air gaps formed therebetween are connected in parallel in the circuit whereby said potential causes leakage currents to flow across the surface of the strips of insulating material bridging the air gaps between the plates, a galvanometer provided in the D. C. circuit for measuring the total leakage currents flowing across the surface of the parallel strips of the insulating material from which current the surface resistivity of the insulating material may be determined, and a separate circuit connected to the guard plates positioned between the insulated supports of the plates for preventing any leakage currents between the supports from passing through the galvanometer, whereby only the leakage currents flowing across the surface of the parallel strips of the insulating material bridging the air gaps flows through the galvanometer.

7. An apparatus for measuring the surface resistivity of insulating materials having a surface resistivity in excess of $10^{12}$ ohms per square, which comprises a plurality of contact plates, means for mounting the contact plates spaced apart and with the edges of the plates lying in a single plane, means for clamping a piece of material to be tested against said edges of the contact plates, means electrically isolating adjacent contact plates from one another, means for impressing across adjacent contact plates a D. C. potential of sufficient intensity to cause current to flow between the adjacent contact plates along the surface of the material, and means for measuring the total current flow.

8. An apparatus for measuring the surface resistivity of insulating materials having a surface resistivity in excess of $10^{12}$ ohms per square, which comprises a plurality of spaced contact plates, a support for spacedly mounting a series made up of all the odd-numbered plates of said spaced contact plates, a second support for spacedly mounting a second series made up of all the even-numbered plates of said spaced contact plates, said supports being respectively positioned so that the edges of all the plates of both series lie in a single plane, means for clamping a piece of material to be tested against said edges of the contact plates, means for impressing across adjacent contact plates a D. C. potential of sufficient intensity to cause current to flow between the adjacent contact plates along the surface of the material, means for measuring the total current flow, guard plates for electrically isolating the supports from each other, and a separate circuit connected to the guard plates so that any leakage currents flowing through the guard plates bypasses the measuring means whereby only the leakage currents flowing across the surface of the material to be tested are measured by said measuring means.

LOWELL J. MOELLER.

References Cited in the file of this patent

UNITED STATES PATENTS

| Number | Name | Date |
|---|---|---|
| 1,506,761 | MacPherson | Sept. 2, 1924 |
| 1,766,991 | Gardner | June 24, 1930 |
| 1,942,046 | Bottome | Jan. 2, 1934 |
| 2,047,638 | Kott | July 14, 1936 |
| 2,377,426 | Kersten | June 5, 1945 |

FOREIGN PATENTS

| Number | Country | Date |
|---|---|---|
| 760,082 | France | Aug. 25, 1933 |